Oct. 19, 1965  H. C. JOHNSEN  3,212,599
SEISMIC EXPLORATION
Filed Nov. 8, 1961  4 Sheets-Sheet 1
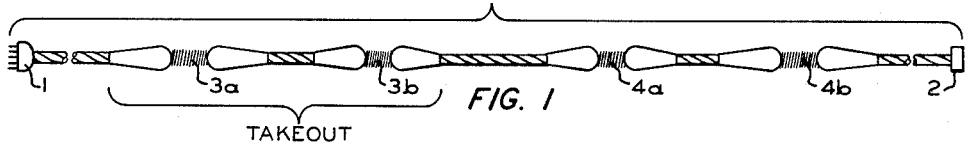
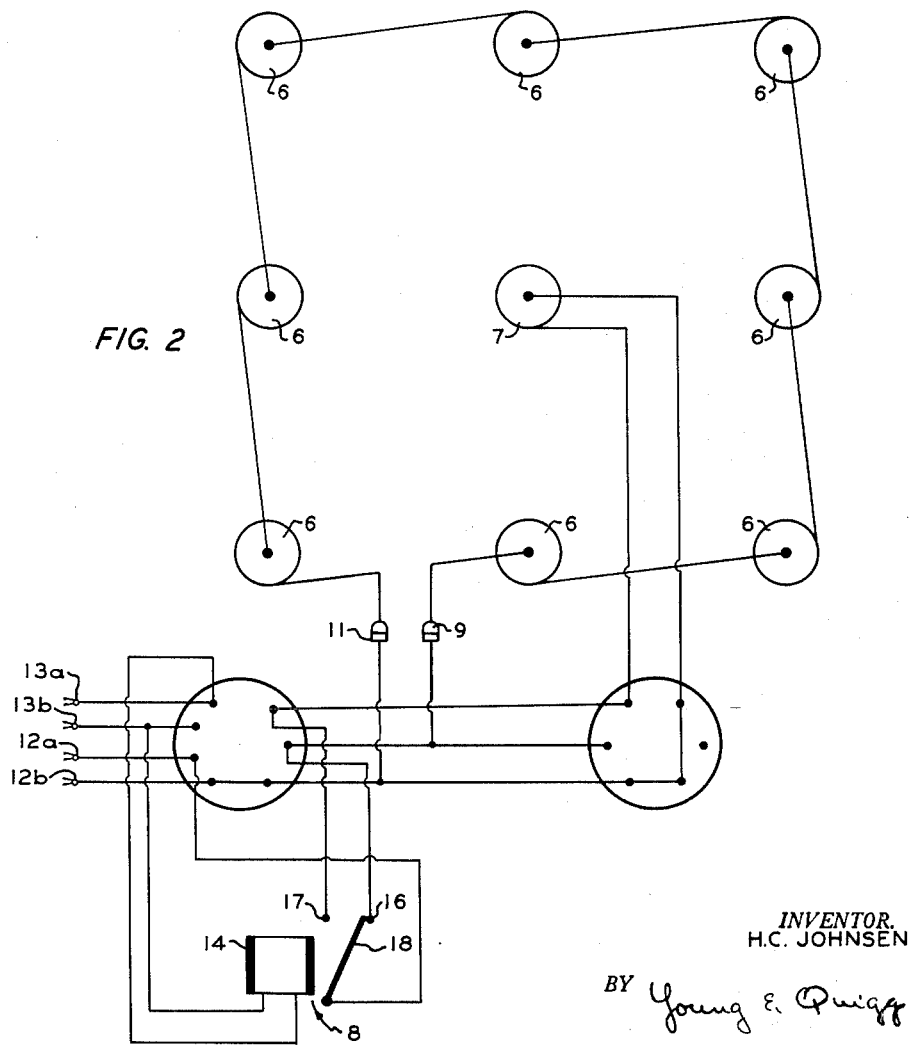
INVENTOR.
H.C. JOHNSEN
BY Young & Quigg
ATTORNEYS

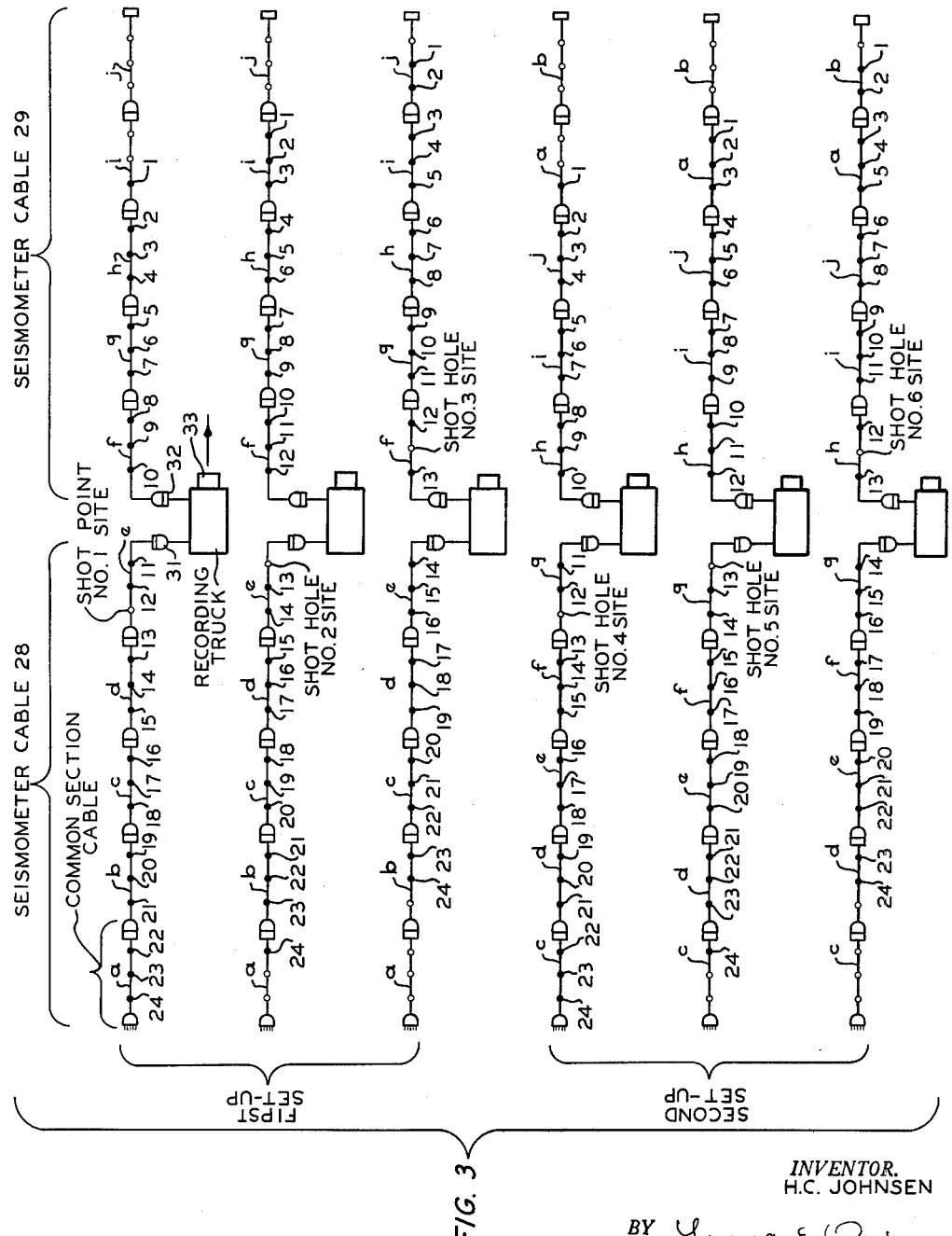

INVENTOR.
H.C. JOHNSEN
BY Young E. Quigg
ATTORNEYS

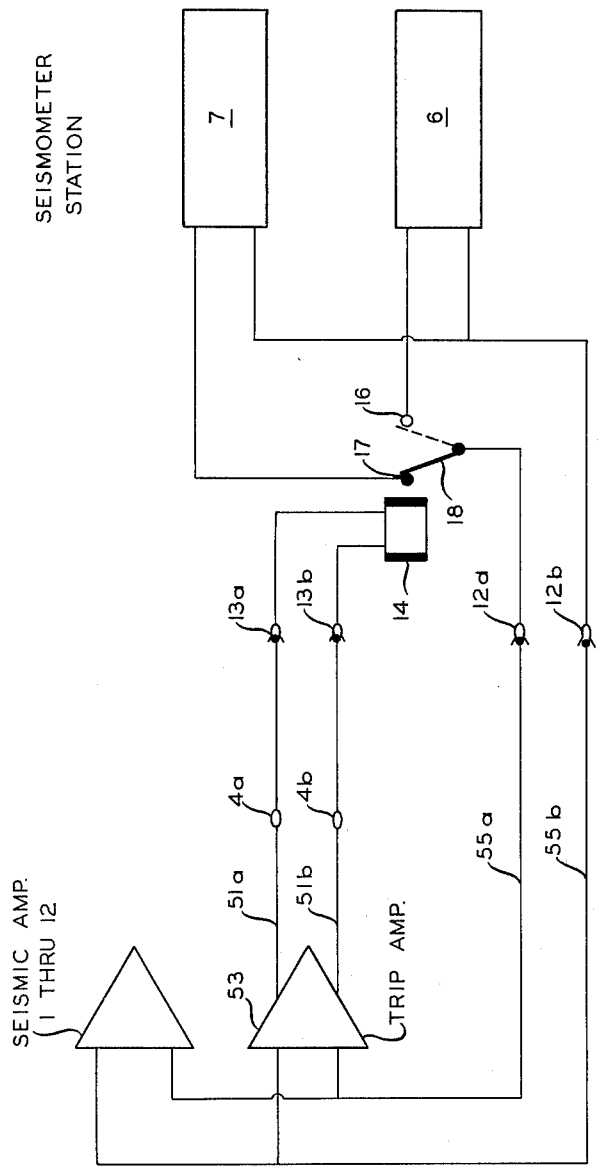

United States Patent Office 3,212,599
Patented Oct. 19, 1965

3,212,599
SEISMIC EXPLORATION
Harry C. Johnsen, Bartlesville, Okla., assignor to Phillips Petroleum Company, a corporation of Delaware
Filed Nov. 8, 1961, Ser. No. 150,909
2 Claims. (Cl. 181—.5)

This invention relates to seismic exploration of subsurface geological formations, and more particularly to an improved method and apparatus for carrying out such exploration. In another aspect, it relates to an improved method and apparatus for arranging, coupling, and operating seismometer stations in an expeditious manner to reduce the expense, time and labor of reflection seismic operations in the field.

The art of carrying out seismic exploration of subsurface geological formations entails first of all the artificial production of elastic waves at a first point near the earth's surface and the detection of the resulting seismic waves at a series of second points at the earth's surface spaced from said first point. The elastic waves are commonly generated by detonating explosives in one or more shallow bore holes (each called the "shotpoint" or "shothole"). The elastic waves propagate downwardly and outwardly into the subsurface formations and are refracted and reflected by various discontinuities in the earth's structure to the plurality of second points where the waves are detected by a plurality of seismometer stations disposed in a predetermined geometric array in horizontally spaced relationship with the shotpoint. The seismometer stations convert the detected, reflected or refracted seismic waves into corresponding electrical seismic signals which are amplified and recorded. In seismic exploration today, it is the reflection seismic signal which is most commonly used in the study of geological formations, and it is reflection seismic exploration which is the chief concern of this invention. The recorded reflection seismic signals, in the form of a seismograph record or seismogram, are examined and interpreted to locate and determine the nature of the geological structures existing beneath the earth's surface, such as the depth and dip of the subterranean reflecting beds.

A reflection seismic exploration technique which enjoys widespread application is the method of "continuous profiling," and the subject invention provides an improvement in this technique. In this technique, the seismometer stations are spaced uniformly along a prospect line. A plurality of evenly spaced shotpoints are placed along the prospect line, or offset a constant distance therefrom, and intercept a constant number of seismometer stations. By generating elastic waves successively at each of the shotpoints, while advancing in one direction along the prospect line, a continuous profile or recording is obtained from successive continuous portions of the subsurface strata. In continuous profiling, use is made of long seismometer cable spreads, thereby achieving the separation of multiple reverberations from primary reflection signals. In shooting such a continuous seismic profile, it has been the usual practice heretofore to move or advance the truck carrying the amplifying-recording equipment after each shot to the vicinity of the next shotpoint, and to physically pick up and move or advance the seismometer cable and accompanying seismometer stations and set up the same at the new shotpoint. Since successive shotpoints may be on the order of several thousands of feet apart, it is evident that considerable expense, time, and labor is expended by the seismic field party in each day's work, if, as is customary, 10 to 20 setups are used each day. The high cost of field operations makes the time factor of paramount importance and those concerned with seismic operation are constantly looking for ways to reduce the expense, time, and effort expended by the seismic field party.

Accordingly, an object of this invention is to improve seismic exploration of subsurface geological formations. Another object is to provide an improved method and apparatus for arranging, coupling, and operating seismometer stations in an expeditious manner to reduce the expense, time, and labor of reflection seismic operations in the field. Another object is to provide an improved method and apparatus for increasing the number of shotpoints which can be detonated and recorded during one seismic setup. Another object is to provide an improved method and apparatus for making continuous profiles of subsurface geological formations. Another object is to make use of long seismometer cable spreads (e.g., 2 miles) in a more economical and convenient manner. Further objects and advantages of this invention will become apparent to those skilled in the art from the following discussion, appended claims, and accompanying drawing in which:

FIGURE 1 is a view illustrating a typical "common section cable" used in this invention;

FIGURE 2 is a diagram of a typical seismometer station used in this invention;

FIGURE 3 is a diagram illustrating the layout of seismometer cable in two setups, according to this invention;

FIGURE 6 is a diagram illustrating in detail a trip amplifier circuit used in this invention.

Figure 5:
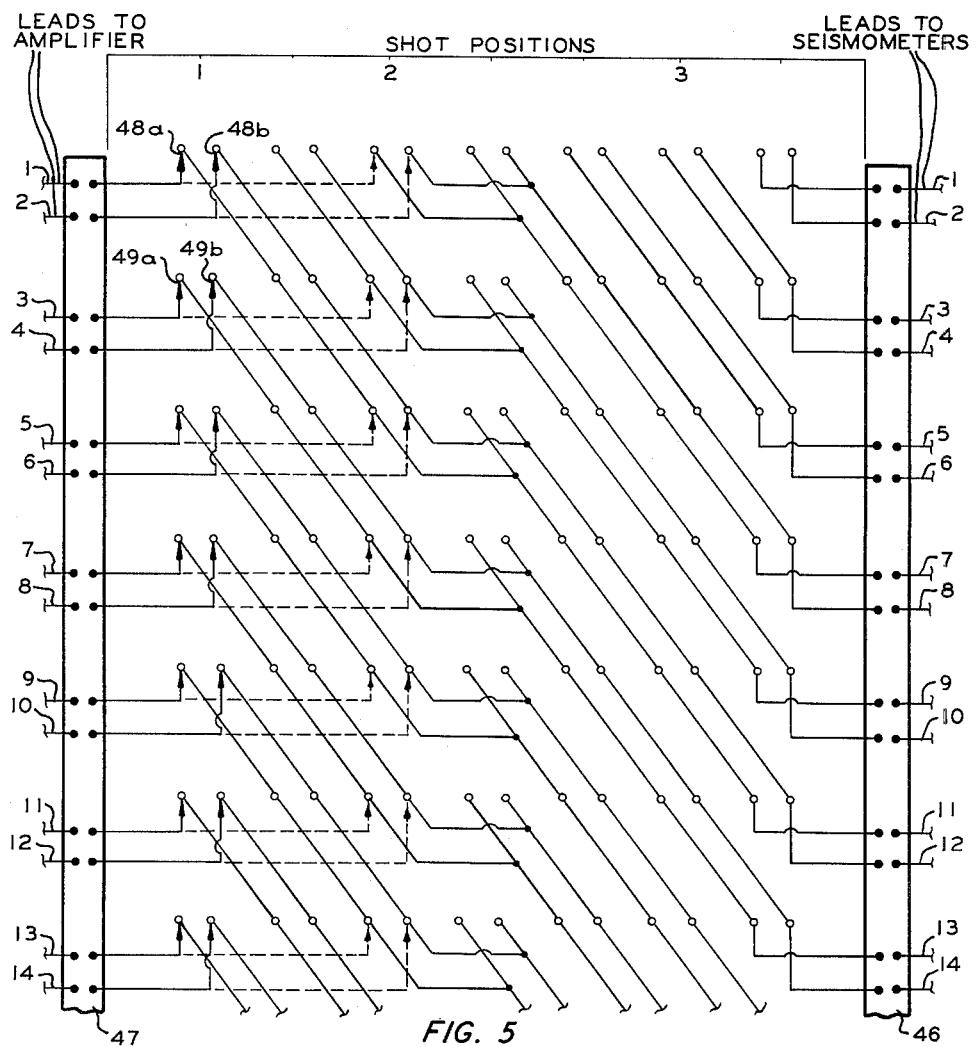
FIGURE 5 is a diagram illustrating in detail a portion of the switching unit of FIGURE 4.

Referring now to the drawing, and initially to FIGURE 1, a typical "common section cable" used in this invention is illustrated. This common section cable comprises a plurality of insulated pairs of conductors covered by an extruded insulating sheet, one such pair of conductors being provided for each seismometer station and adapted to convey seismic signals. The common section cable is also provided with one additional pair of conductors which is used in common by all of the seismometer stations for the purpose which will be described in detail hereinafter. These conductors are connected at one end of the cable to a male plug or connector 1 and at the other end of the cable to a female plug or connector 2. Such mating plugs provide a means for coupling together in a predetermined fashion a plurality of such common section cables, so as to form a composite seismometer cable having conductors running the length thereof. At fixed intervals along the length of the common section cable, there are provided a plurality of pairs of conductor connectors 3a, 3b (each pair hereinafter referred to as a "takeout," only one of which is shown in FIGURE 1). One connector of each takeout is permanently spliced to one conductor of a pair of conductors and the other connector of the pair is permanently spliced to the other conductor of such pair of conductors. One takeout thus made is provided for each seismometer station. For example, a typical common section cable will have two or three such takeouts. In addition, the common section cable is provided with one or more additional takeouts or pairs of conductor connectors 4a, 4b, one such additional takeout being provided for each seismometer station, only one of which is shown in FIGURE 1. One connector of each of these additional takeouts is permanently spliced to one conductor of a common pair of conductors in the common section cable, and the other connector is permanently spliced to the other conductor of such pair of conductors. As will be apparent hereinafter, each takeout 4a, 4b is adapted to be connected to provide current to operate a relay located at each seismometer station. When current is applied to this relay it connects one or more refraction seismometers at each station to conductor takeouts 3a, 3b. When the current is removed, the relay points provide a connection to the plurality of reflection seismometers used to detect reflection seismic signals. Said additional takeouts 4a, 4b can also be used alternately to connect a telephone to said common pair of conductors in said common section cable, to provide communication between the recording instrument operator and personnel using the telephone. The common section cable can be provided with marks of identifying coloring or the like adjacent each connector so that they may be readily distinguished and properly connected.

A typical common section cable may have a length of 960 feet and be provided with three takeouts 3a, 3b, one such takeout being located in the middle of the common section cable (480 feet from one end), one such takeout being located 165 feet from one end of the cable, and the other such takeout being located 165 feet from the other end of the cable. This typical common section cable can be provided with three additional takeouts 4a, 4b, one such takeout located 164 feet from one end, the other such takeout located 166 feet from the other end of the common section cable, and one such takeout located near the middle of said cable (481 feet from one end).

Where the common section cable is to be used at other times in conjunction with locating the seismometer stations further apart (e.g., 450 feet instead of 300 feet), the common section cable can be provided with additional takeouts 3a, 3b and additional takeouts 4a, 4b, these takeouts being taped to insulate them from the ground when not in use. In the typical common section cable described in the preceding paragraph, the common section cable can be provided with two such taped takeouts 3a, 3b, each located 240 feet from a different end of the cable, and two additional taped takeouts 4a, 4b, one located 239 feet from one end and the other located 241 feet from the other end of the common section cable. Thus, a multi-purpose common section cable is provided, with a varying number of takeouts, some of which are taped when not in use.

FIGURE 2 illustrates a typical seismometer station and it comprises one or more reflection seismometers 6, one or more refraction seismometers 7, and a relay switch generally designated 8. A preferred seismometer station will comprise a plurality or "patch" of reflection seismometers 6 arranged in series or in parallel, or in combinations thereof; this practice is called "multiple detection," the group of reflection seismometers 6 feeding a single channel of the amplifying-recording equipment and is represented by one recording trace. The station further comprises one or more refraction seismometers 7 disposed in substantially the middle of the array of reflection seismometers 6. The array of reflection seismometers 6 are connected to the rest of the seismometer station circuitry by means of suitable mating connectors 9, 11. The seismometer station is provided with first pair of takeout clips 12a, 12b, adapted to be connected to one of the takeouts 3a, 3b of the common section cable, and thereby be placed in electrical circuit with one pair of the seismic signal conductors in the common section cable. The other pair of clips 13a, 13b are adapted to be connected to one of the takeouts 4a, 4b of the common section cable, and thereby be connected in electrical circuit with said common pair of conductors in the common section cable. Solenoid 14 of relay switch 8 is connected by suitable conductors to clips 13a, 13b. One pole 16 of relay switch 8 is connected by means of a conductor to mating connector 9 of the reflection seismometer array, and one pole 17 is connected to refraction seismometer 7. The latter is in turn connected to clip 12b by a conductor, and the other mating connector 11 is connected to this latter conductor. Clip 12a is connected by a conductor to the contactor 18 of relay switch 8.

Referring now to the diagram of FIGURE 3 there is illustrated two seismometer cable setups used in making continuous seismic profile according to this invention. This diagram illustrates how seismometer cable is arranged and used for recording reflected seismic waves produced by successively generating shots at a plurality of shotpoints in a first setup, and how the seismometer cable can be incrementally advanced along a prospect line to record reflected seismic waves produced by successively generating shots at a plurality of shotpoints in a subsequent or second setup. First of all, a prospect line along which it is desired to determine a continuous profile is determined, and then a series of seismic shotholes are drilled, horizontally spaced apart along this line, to provide a plurality of shotpoints. A plurality of seismometer stations, such as that illustrated in FIGURE 2, are horizontally spaced apart along the prospect line where the shotholes have been drilled. These seismometer stations are clipped to the appropriate takeouts of adjacent common section cables, such as shown in FIGURE 1. A plurality of such common section cables are coupled together and strung out along the prospect line. A first plurality of such coupled common section cables extend from one side of the shotpoint, and a second plurality of such coupled common section cables extend in an opposite direction on one side of said shotpoint. One such group of coupled common section cables comprise one seismometer cable 28, and the other such group of coupled common section cables comprise another seismometer cable 29.

These two seismometer cables extended in this manner comprise a seismometer setup. Adjacent ends of the two seismometer cables 28, 29 are connected by means of mating connectors 31, 32 to a recording truck 33 carrying amplifying-recording equipment, so that each pair of seismic signal conductors may be connected to a corresponding amplifying recording circuit. The recording truck 33 is initially placed near the center of a first group of shotpoints. In recording the reflected seismic events occasioned by successively generated shots in the first group of shotpoints in the first setup, the recording truck remains stationary, and only a common number (e.g., twenty-four) of seismometer stations are in electrical circuit with the amplifying-recording equipment for each shot, such common number of stations thus connected called a "spread." In making each shot, the seismometer station adjacent said shotpoint is not connected to the amplifying-recording equipment. After each shot at one of the shotpoints, a different set of common seismometer stations are connected to the amplifying-recording circuit by means of a gang switch or the like carried in the recording truck. As the shots are advanced along the prospect line, one or more of the trailing seismometer stations in the setup are switched out of the amplifying-recording circuit, and one or more of the leading seismometer stations in the setup are switched in the amplifying-recording circuit by the gang switch.

After recording the reflected seismic signals produced by shots made at a plurality of shotpoints in the first setup, the recording truck is advanced along the prospect line to a point near the center of a second group of shotpoints, and for the purpose of recording the reflection seismic signals produced by shots made at these new shotpoints, some of the trailing common section cables and accompanying seismometer stations of the first setup can be disconnected and physically transported by a cable truck in advance to the leading end of the first setup where they can be connected to what was the leading common section cable of the first setup. Thereafter, seismic disturbances are generated at the new group of shotpoints in the second setup and the resulting seismic signals recorded in the same manner as that employed in recording the seismic signals produced by seismic disturbances generated at the first group of shotpoints in the first setup.

For example, in the first setup, a first group of seismometer stations 13–24 are disposed along the prospect line leading to the left of Shotpoint No. 1, and a second group of seismometer stations 1–12 are disposed along the prospect line leading to the right of Shotpoint No. 1. One seismometer cable 28, comprising common section cables *a–e*, and connected to seismometer stations 11–24, is connected by mating connector 31 to the recording truck, and the other seismometer cable 29, comprising common section cables *f–j*, to which are connected seismometer stations 1–10 and certain other seismometer stations not needed for Shotpoint No. 1, is connected by means of mating connector 32 to the recording truck. Seismometer stations 1–24 are connected in separate amplifying-recording circuits and are used to record the seismic disturbances generated at Shotpoint No. 1.

In preparing for the next shot at Shotpoint No. 2, certain of the seismometer stations are switched into the amplifying-recording circuit, and certain others are switched out of this circuit. For example, the two trailing seismometer stations of common section cable *a* are switched out of this circuit, and the leading two seismometer stations of common section cable *i* are switched into the circuit. Further, the seismometer station adjacent Shotpoint No. 2 is switched out of the amplifying-recording circuit. A shot is fired at Shotpoint No. 2 and the seismic signals recorded in the same manner as before.

In preparing for the recording of the seismic signals occassioned by a seismic disturbance at Shotpoint No. 3, again certain of the trailing seismometer stations are switched out of the amplifying-recording circuit and certain of the leading seismometer stations are switched into this circuit by the gang switch. For example, all of the seismometer stations of common section cable *a* and the trailing seismometer station of common section cable *b* are switched out of the amplifying-recording circuit, and all but the first or leading seismometer station of common section cable *j* are switched into the circuit. The seismometer station adjacent Shotpoint No. 3 is disconnected from common section cable *f*. A shot is then fired at Shotpoint No. 3, and the seismic signals recorded as before.

For purposes of brevity, I have shown in FIGURE 3 and discussed hereinbefore the generation of seismic disturbances at only three shotpoints, these shotpoints being located adjacent alternate seismometer stations. It is within the scope of this invention to generate seismic disturbances adjacent successive seismometer stations, rather than skipping every other one as was done in FIGURE 3, and to switch into the amplifying-recording circuits a common number of seismometer stations adjacent each of these shotpoints. For example, after the first shot at Shotpoint No. 1 and the recording of the resulting seismic signals, I can repeat the shot at the next adjacent seismometer station, the location of which will be adjacent the middle seismometer station connected to common section cable *e*. In this case, the trailing seismometer station connected to common section cable *a* will be switched out of the amplifying-recording circuit, and only the first two trailing seismometer stations connected to common section cable *i* will be switched into the circuit. Further, the middle seismometer station connected to common section cable *i* will be switched into the circuit. Further, the middle seismometer station connected to common section cable *e* will be switched out of the circuit, since such a shot is to be generated adjacent the location of this seismometer station. It is thus seen that by using seismometer cables each comprising five coupled common section cables, each of which is connected to three seismometer stations, I can make up to six shots in one setup, i.e., without moving the record truck while making the shots and recording the resulting seismic signals.

When all of the seismometer stations of a trailing common section cable are switched out of the amplifying-recording circuit, such common section cables and accompanying seismometer stations may be transported by a cable truck to the leading end of the seismometer setup. These transported cables are coupled to the leading common section cable for subsequent shooting at the next setup. For example, in FIGURE 3, after the second shot is fired and the resulting seismic signals recorded, common section cable *a* and its accompanying seismometer stations may be disconnected from the trailing end of common section cable *b* and transported by the cable truck to the leading end of the seismometer setup where it may be laid out adjacent to the leading end of seismometer cable *j*, preparatory to shooting at the subsequent setup. Or, after completing the shooting and recording at Shotpoint No. 3, common section cables *a* and *b* can be removed from the trailing end of the seismometer setup and transported to the leading end of the seismometer setup and connected thereto when shooting at the subsequent setup.

After thus moving the recording truck to the next group of shotpoints in the second setup, and providing the requisite number of common section cables adjacent the leading end of the second setup, as described in the preceding paragraph, the seismometer setup is ready to record the seismic signals produced by seismic disturbances successively made at the new set of shotpoints. The making of these shots and the recording of the resulting seismic signals in this second setup is carried out in the same manner as first setup. The trailing common section cables used in the second setup may be transported to the subsequent setup.

Rather than transporting the trailing common section cable to the leading end of the next setup right after it has served its purpose, all such used common section cables can be picked up and transported by the cable truck at the end of the day, and a sufficient number of additional common section cables laid out in advance along the prospect line during the day, such additional cables being connected to the leading end of the setups when necessary.

Figure 4:
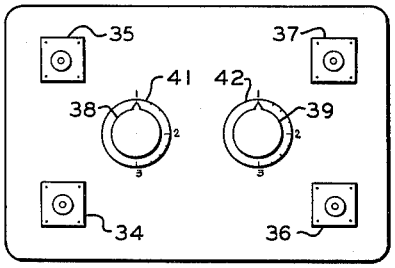
FIGURE 4 is a view illustrating the panel of a multi-shot switching unit used in this invention.

FIGURE 4 illustrates the panel of a multi-shot unit used in this invention. This unit is carried by the recording truck along with the amplifying-recording equipment. The unit is provided with two input plugs 34, 35, one for each seismometer cable 28, 29 of FIGURE 3, and two outplugs 36, 37 which are used to transmit the input seismic signals to corresponding amplifiers. Within the unit there is provided one or more switches adapted to permit connecting the appropriate seismometer stations to corresponding amplifying-recording circuits. I prefer to use two switches, each provided with a plurality of stators or decks, such as a 2C1887–G made by the Shallcross Mfg. Company, Collingdale, Penn., as described in its Bulletin ALS 10M 10–57, copyright 1957. Such switches are ordinarily referred to in the art as gang switches, and their construction and operation are well known to those skilled in the art. They comprise a plurality of stators or discs maintained on a shaft, the end of which is provided with a knob and a dial containing appropriate reference numbers. Such knobs are designated 38, 39 and such dials designated 41, 42 in FIGURE 4. In this application of such switches, the reference numbers "1," "2," "3" refer to the shotpoints of FIGURE 3. One of these switches in FIGURE 4 is associated with the leading seismometer cable 28, and the other switch is associated with the trailing seismometer cable 29. In making a shot at Shotpoint No. 1 in FIGURE 3, each of these two switches will be turned to No. 1 on the switch dial, after which these switches will be turned to No. 2 on the dial for the second shot, etc. Where six shots are made per setup in FIGURE 3, without skipping seismometer stations, such dials can be provided with reference numbers "1," "2," "3," "4," "5" and "6," one such number corresponding to each of said six shots in said setup. Alternatively, the dials can be provided with a scale for a six shotpoint setup and a scale for a four shotpoint setup, thus allowing the same knob to be used for either type of recording without rewiring the multishot unit. For example, the knob of the switch connected to stations 13–24 in a six shotpoint setup can be turned to shotpoint number 3, and the input wiring for this shotpoint will be the same as shotpoint number 2 in a four shotpoint setup.

FIGURE 5 diagrammatically illustrates a portion of such a gang switch. In FIGURE 5, the pairs of conductors connected to terminals on insulated bar 46 are connected to the corresponding conductors in the seismometer cable. The other conductors connected to insulated bar 47 on the left hand side of FIGURE 5 are connected to corresponding amplifiers. The switch is provided with pairs of contactors 48a, 48b, and 49a, 49b, etc. Such contactors correspond to the rotors of the gang switch, and move in unison. As schematically shown in FIGURE 5, such contactors move in unison to the right. In the position shown in FIGURE 5, which corresponds to "Shot Position 1," contactors 48a, 48b connect the pair of conductors 11, 12 from the seismometer cables to conductors 1, 2 leading to a corresponding amplifier No. 1. Similarly, in a position shown, contactors 49a, 49b connect the pair of conductors 13, 14 from the seismometer cables to conductors 3, 4 of a corresponding amplifier No. 2, etc. In preparing for the second shot at Shotpoint No. 2 of FIGURE 3, rotation of knobs 38, 39 to dial No. 2 in FIGURE 4 results in the movement of the contactors of FIGURE 5 in unison to the right under "Shot Position 2." With the contactors in this position shown by broken lines in FIGURE 5, contactors 48a, 48b, for example, will now connect conductors 7, 8 of the seismometer cables to conductors 1, 2 of amplifier No. 1, etc. Similarly, when knobs 38, 39 of FIGURE 4 are switched to No. 3 on the corresponding dials, the contactors of FIGURE 5 will move to the right and occupy a position under "Shot Position 3." Of course, where more than three shots are fired per setup, and the switches of FIGURE 4 are provided with additional shotpoint numbers, and contactors of FIGURE 5 are accordingly moved to other positions corresponding to these other shotpoints.

In a typical operation of the apparatus shown in the drawing, preparation for firing a shot at Shotpoint No. 1 is made by switching out the trailing seismometer station of common section cable e adjacent Shotpoint No. 1. Switches 38 and 39 of FIGURE 4 are turned to dial position No. 1, whereby the contactors of FIGURE 5 occupy the positions under "Shot Position 1." An appropriate switch on the trip amplifier circuit as shown in FIGURE 6 (such as that disclosed in U.S. 2,982,919 issued May 2, 1961 to O. C. Montgomery) in the recording truck is thrown to send a current, e.g., 45 volts, along one pair of conductors 51a and 51b in each of the seismometer cables, such current being transmitted to all seismometer stations of the seismometer setup. In each case, as shown in FIGURE 2, this current is supplied to the solenoid 14 of the relay 8, causing contactor 18 to contact pole 17. As such, the refraction seismometer 7 is placed in electrical circuit with the seismic signal pair 3a, 3b of conductors in each common section cable. The initial seismic signals (called refraction signals) to reach each seismometer station of the seismometer setup are detected by the refraction seismometer at each of the seismometer stations, and these signals are transmitted to the amplifying-recording equipment through lines 55a and 55b. Such equipment is provided with a trip amplifier 53 circuit for each bank of twelve seismic recording amplifiers. One function of the trip amplifier is to automatically remove the current supplied to relay 8 (FIGURE 2) at all seismometer stations through a common pair of conductors in the seismometer cables. The trip amplifier circuit for seismic amplifiers 1–12 is operated by the refraction signals received from seismometer station 1. The same circuit for amplifiers 13–24 is operated by refraction signals received from seismometer station 24. Since stations 1 and 24 are farthest from the shotpoint, they receive their signals last. Therefore, refraction signals are recorded from all 24 stations before reflection signals are received. When the current for relay 8, at all seismometer stations, is removed, refraction seismometer 7 is automatically disconnected and the array of reflection seismometers 6 is automatically connected to each amplifying-recording circuit. Thereafter, the seismic signals reflected from subsurface strata are detected by the reflection seismometers 6 along the entire seismometer setup. These detected seismic events are transmitted by the seismometer cables to the amplifying-recording equipment on the record truck. In preparing for the second shot, switches 38 and 39 of FIGURE 4 are turned to dial position No. 2 corresponding to the second shotpoint position, this switching automatically removing the two trailing seismometer stations of common section cable a from the amplifying-recording circuit, and automatically placing the two leading seismometer stations of common section cable i in the circuit. At the same time, the seismometer station which was adjacent Shotpoint No. 1 is switched in, this seismometer station now corresponding to station 14, and the seismometer station adjacent the second shotpoint, which was used as station 11 in recording the first shot, is switched out. Next, the current from the 45-volt source is applied to the relay switches of all seismometer stations in all cables. Again, this results in placing the refraction seismometers 7 of all stations 1 through 24 in the amplifying-recording circuit. A shot is then fired at Shotpoint No. 2, and the initial seismic disturbances detected by the refraction seismometers 7 at all 24 seismometer stations. Thereafter, the reflection seismometers 6 at all 24 stations of the seismometer setup are placed in the amplifying-recording circuit and they detect the resulting seismic events.

The preparation for the third shot is accomplished in the same manner as before. As described hereinbefore, after the last shot is fired and recorded in each setup, the recording truck is advanced to a point near the center of the next group of shotpoints, prior to which time the requisite number of seismometer stations have been placed adjacent to the leading end of the subsequent setup.

This invention is particularly useful in carrying out the common reflection point technique of continuous profiling disclosed and claimed in U.S. 2,732,906, issued January 31, 1956 to W. H. Mayne, but it is not necessarily limited thereto.

Various modifications and alterations will become apparent to those skilled in the art without departing from the scope and spirit of this invention, and it should be understood that the foregoing discussion and accompanying drawing are not to be construed to limit unduly this invention.

I claim:

1. An improved system for conducting reflection seismic exploration, comprising in combination a plurality of common section seismometer cables, said cables being positioned in a prospect line along a surface undergoing seismic exploration, wherein said plurality of cables constitute a set-up; a plurality of coupling means located at the extremities of each of said plurality of cables for coupling the extremities of adjacent cables together, said coupled cables constituting a seismometer spread with the total number of cables in such a spread being constant and less than the number of cables in said set-up, said spread extending the same distance on both sides of each of a plurality of points along said prospect line; explosive means located at said plurality of points for generating seismic disturbances; a recording station for recording the reflection of said seismic disturbances; an array of reflection seismometers located at each of said plurality of points along said prospect line; at least one refraction seismometer located at each of said plurality of points along said prospect line, said refraction seismometer being in electrical communication with said recording station; a plurality of pairs of conductors extending through said cables, said plurality having one pair for connecting each array of reflection seismometers with said recording station; and one pair for connecting all the refraction seismometers with said recording station; a plurality of relay means located at each of said plurality of points; energizing means located in said recording station for energizing said relay means through said one pair of conductors to place the refraction seismometers located at each of the plurality of points into electrical communication with said recording station at the time said seismic disturbances are first generated; a trip amplifier means operatively connected with that refraction seismometer located at the extremities of said seismometer spread, said trip amplifier being adapted to de-energize said relay means upon receipt of a refraction signal from that refraction seismometer located at said extremity thereby placing the arrays of reflection seismometers into electrical communication with said recording station; switching means for simultaneously removing the seismometers located at one or more trailing points from said seismometer spread and coupling to the leading ends thereof the seismometers located at one or more points positioned along said prospect line in advance of said seismometer spread.

2. An improved method for conducting reflection seismic exploration, said method comprising the steps of establishing a plurality of common section seismometer cables along a surface to be explored, said plurality of cables constituting a set-up; coupling a plurality of said cables together to form a seismometer spread wherein the total number of cables in such a spread is constant and less than the number of said cables in said set-up, said spread extending the same distance on both sides of each of a plurality of points along a prospect line; locating an array of reflection seismometers at each of said plurality of points along said prospect line; locating at least one refraction seismometer at each of said plurality of points along said prospect line; generating seismic disturbances at at least one of said plurality of points; initially detecting a plurality of refraction waves produced by said seismic disturbances; recording said plurality of reflection waves; subsequently detecting the plurality of reflection waves produced by said seismic disturbances immediately upon recording of a refraction signal from that refraction seismometer located at the extremity of said seismometer spread; recording said plurality of reflection waves and switching one or more trailing arrays of reflection seismometers from said seismometer spread and switching into a leading end of said seismometer spread one or more arrays of reflection seismometers in said set-up positioned along said prospect line in advance of said seismometer spread.

References Cited by the Examiner
UNITED STATES PATENTS

| | | | |
|---|---|---|---|
| 2,088,588 | 7/37 | Dudley | 181—.5 |
| 2,260,217 | 10/41 | Eckhardt et al. | 181—.5 |
| 2,317,334 | 4/43 | Shimek | 181—0.5 |
| 2,321,450 | 6/43 | Athy et al. | 181—0.5 |
| 2,329,721 | 9/43 | Hoover et al. | 181—0.5 |
| 3,105,568 | 10/63 | Jolly | 181—.5 |

SAMUEL FEINBERG, *Primary Examiner.*

CHESTER L. JUSTUS, *Examiner.*

UNITED STATES PATENT OFFICE
CERTIFICATE OF CORRECTION

Patent No. 3,212,599 October 19, 1965

Harry C. Johnsen

It is hereby certified that error appears in the above numbered patent requiring correction and that the said Letters Patent should read as corrected below.

Column 10, line 8, for "reflection" read -- refraction --.

Signed and sealed this 6th day of September 1966.

(SEAL)
Attest:

ERNEST W. SWIDER
Attesting Officer

EDWARD J. BRENNER
Commissioner of Patents